United States Patent Office 3,518,408
Patented June 30, 1970

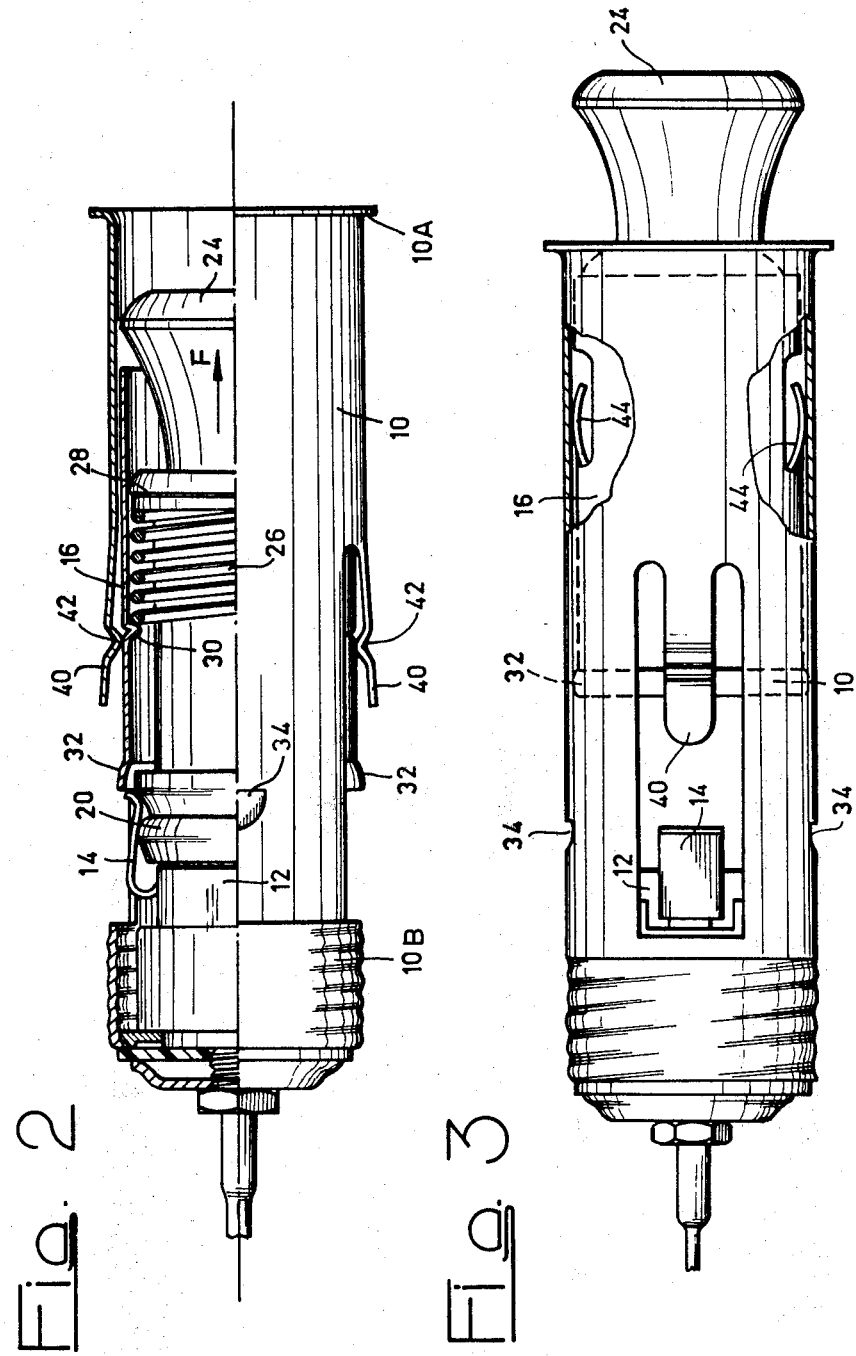

3,518,408
RETRACTABLE CIGAR LIGHTER
Sergio Pitacco, Moncalieri, Italy, assignor to Falcos
S.p.A., Moncalieri, Torino, Italy, a joint-stock company of Italy
Filed Aug. 15, 1968, Ser. No. 752,943
Claims priority, application Italy, Sept. 6, 1967,
52,934/67
Int. Cl. F23g 7/00
U.S. Cl. 219—264         2 Claims

ABSTRACT OF THE DISCLOSURE

A retractable cigar lighter for mounting in a vehicle has a tubular body housing a relatively slidable bushing. A lighter member is slidable in the bushing, against the action of a biassing spring, into engagement with electrical heating contacts at a closed end of the body, being released automatically when it has been heated sufficiently so as to spring outwards, carrying with it the bushing, until the latter is arrested by resiliently yieldable retaining elements, at a position in which a knob attached to the lighter member projects beyond the mounting panel for the lighter.

---

This invention relates to retractable cigar lighters suitable for mounting on motor vehicle instrument panels.

A known type of retractable cigar lighter has an operating knob which is retracted into a socket in the instrument panel to avoid accidental operation. The built-in location is prescribed by law in certain countries.

Retractable cigar lighters of this type present a problem since it is necessary to grip the knob of the lighter for withdrawing a heated lighter member from the instrument panel recess when an electrical heater element in the member has reached a given degree of incandescence. For this purpose the lighter member is gripped in the socket by means of bimetallic nippers which release the member at the required temperature. Upon such release, the member is moved under the action of a spring so that its knob projects from the socket.

In earlier known lighters of this type a complex arrangement, including various return springs, is provided, and this is both expensive and rather difficult to manufacture and assemble on account of the relatively large number of parts required.

The invention has for its main purpose to provide a retractable cigar lighter which, while still utilising the same principle as the known type of lighter, does not involve as many component parts. More specifically, a further object of this invention is to provide a lighter of this type by employing conventional components only.

Broadly, the invention provides a retractable cigar lighter comprising a tubular body having an open end and a closed end, a bushing slidable in said body and housing a relatively slidable lighter member which is resiliently biassed within the bushing towards the open end of the body, a fixed limit stop carried by the body and engageable by the bushing to limit travel thereof toward the closed end of the body, releasable retaining means adapted to engage and retain the lighter member to complete an electrical heating circuit therefor when the lighter member is urged towards the closed end of the body, and resilient means for reiliently retaining the bushing in the body in a position in which a knob attached to the lighter member projects from the open end of the body after release of the lighter member by the releasable retaining means upon completion of heating of the lighter member.

According to a preferred feature of the invention the resilient means are carried by the tubular body and act on a detent carried by the bushing. Advantageously, the resilient means comprise at least one resilient spring strip cut from the wall of the tubular body and having an inwardly projecting portion adapted to engage resiliently the said detent. The detent is preferably constituted by an annular bead formed on the external surface of the bushing.

In order that the invention may be more clearly understood a preferred embodiment will be described, by way of example, with reference to the accompanying drawings, in which:

FIG. 2 is a similar view showing the cigar lighter in its heating position, and

FIG. 3 is a partly cut away side view on line III—III of FIG. 1 showing a cigar lighter in its "ready" position.

Figure 1:
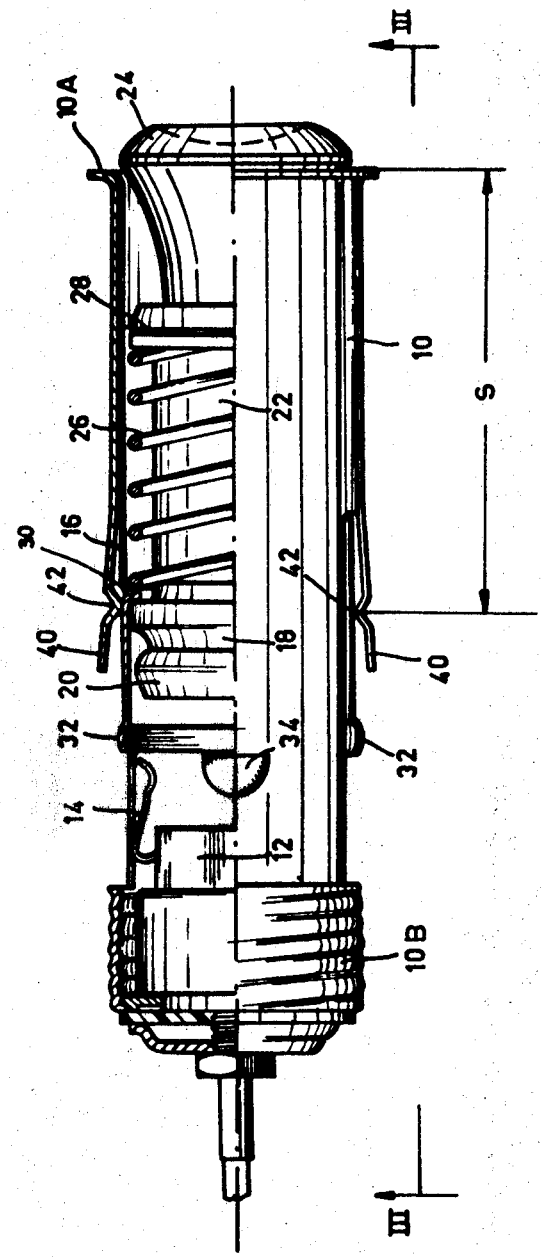
FIG. 1 is a part sectional side view of a cigar lighter according to the invention in its inoperative or retracted position.

In the drawings, 10 denotes a fixed tubular body of the cigar lighter, having an open end surrounded by an external annular flange 10A for abutment against an instrument panel (not shown) when the body 10 is received in a hole in the panel. The opposite end of the body 10 is closed and has a screw-threaded part which houses in the usual manner a plug 12 carrying electrical connectors and a pair (one only is shown) of bimetallic nippers 14.

A metal bushing is inserted in and is slidable axially within the tubular body 10, the bushing 16 housing a relatively slidable lighter unit including a lighter member 18. The lighter member 18 comprises a metal cup 20 surrounding a spirally wound electrical heater element (not shown) and is fast with the stem 22 which is attached at its other end to an operating knob 24.

A helical return spring 26 surrounds the stem 22 and is pre-stressed between an annular collar 28 arranged at the base of the knob 24 and an annular internal flange 30 formed in the wall of the bushing 16. The end of the bushing 16 remote from the knob 24 is widened to form a circumferential bead 32 having a rounded profile.

In the operative or retracted position, FIG. 1, the bead 32 of the bushing 16 abuts against a fixed limit stop comprising a diametrically opposed pair of crescent-shaped inwardly projecting lips 34 cut from the wall of body 10. In this position the lighter member 18 is urged by the spring 26 towards the open end of the body 10 until it abuts the flange 30. The tubular body 10 is axially dimensioned so that when the lighter member 18 is in its inoperative position the knob 24 is retracted or recessed into the open end of the tubular body 10 without forming a dangerous projection from the instrument panel.

To use the cigar lighter the knob 24 is pushed further into the body 10 to a heating position, FIG. 2, in which the heater element associated with the lighter member 18 makes electrical contact with the connectors of the plug 12. Since the bushing 16 remains against the lips 34, the spring 26 is compressed by the movement of the lighter member 18 into the heating position. However the member 18 is retained in this position by the bimetallic nippers 14 which resiliently engage the cup 20 and maintain the electrical connection to the heating element. When the lighter member 18 has reached a predetermined temperature, the bimetallic nippers 14 expand and release the cup 20, so that the lighter unit moves rapidly under the action of the spring 26 in the direction of arrow F.

At this stage the resilient means provided by the invention come into action, the said means comprising in the embodiment shown a diametrically opposed pair of resilient longitudinal spring strips 40 cut from the wall of the tubular body 10 and bent inwardly to V-shape to form a pair of pawls 42. The spacing S (FIG. 1) of the pawls 42 from the open end of the tubular body 10 substantially equals the length of the bushing 16. Consequently, when the lighter unit moves in the direction F under the action of the spring 26, the inert mass of the unit, comprising the lighter member 18, its stem 22 and the knob 24, acquires a momentum with respect to the bushing 16: when the lighter member 18 abuts the flange 30 on the bushing 16, some of this momentum is imparted to the bushing 16 which is likewise carried along in the direction of the arrow F.

The moment the bushing 16 is about to issue from the open end of the tubular body 10, the resilient stop pawls 42 abut the detent formed by the bead 32 and resiliently retain the bushing 16 in its "ready" position, shown in FIG. 3, in which the knob 24 projects from the tubular body 10, and hence from the instrument panel, by a sufficient extent to permit its seizure by the hand of a user. By now pulling the knob 24, the user withdraws from the tubular body 10 the whole lighter unit and its bushing 16 and uses the hot end of the member 18 for lighting a cigar or cigarette. When this is done, the lighter unit and bushing 16 are again inserted into the tubular body 10 until the bead 32 abuts the lips 34, FIG. 1. During such insertion the pawls 42 resiliently oppose at a given moment the passage of the bead 32 therebetween, whereby the return spring 26 is somewhat compressed; upon slight pushing, however, the spring strips 40 resiliently yield and the bushing 16 snaps forwardly into engagement with the lips 34. Thus the user is relieved of any concern about correct and full insertion of the lighter member 18 into its inoperative position (FIG. 1).

Adjustable friction means preferably act between the bushing 16 and tubular body 10 in order to give controlled braking of the movement of the bushing 16 under the impetus of the lighter unit when the latter is released from the nippers 14. Such friction means in this embodiment comprise one or a plurality of resilient tongues 44, FIG. 3, cut from the wall of the bushing 16 and frictionally engaging the internal surface of the tubular body 10. By suitably adjusting the tongues 44 the bead 32 can be prevented from over-running the pawls 42 upon release of the lighter member, thereby preventing undesirable projection of the lighter unit and bushing 16 from the tubular body 10. However, a sufficient braking action may be provided by the pawls 42 alone if care is taken to cause them to press against the outer surface of the bushing 16.

It will be appreciated that this invention is not limited to the embodiment herein described, and a number of modifications and improvements may be made thereto without departing from the scope of the appended claims.

I claim:
1. Retractable cigar lighter comprising in combination:
   (a) a tubular body having an open end and a closed end and being formed from the tubing of substantially constant cross-section;
   (b) a bushing slidable into and from the open body through its open end;
   (c) a lighter member housed for limited sliding movement in said bushing and having a knob rigidly attached to itself at one end, the knob being of smaller cross-section than the body to enable the knob to enter the body;
   (d) resilient means resiliently biasing said lighter member within said bushing to a position in which the knob projects from an end of the bushing;
   (e) a fixed limit stop carried by the body and engageable by the bushing to limit travel thereof towards the closed end of the body to a position in which the knob is substantially wholly within the body;
   (f) releasable retaining means engageable with the lighter member to retain the lighter member when the knob is pressed inwards in the body against the action of the resilient biasing means;
   (g) an electrical heating element secured to the lighter member;
   (h) conductive means making electrical contact with said heating element upon engagement of the lighter member by the retaining means, said retaining means being self-releasing upon heating of the lighter member to a given temperature, and
   resilient means for resiliently arresting the bushing in the body after release of the lighter member by the resilient retaining means, the arresting means being arranged to arrest the bushing in a position in which substantially the whole length of the bushing is located within the body and the knob projects from the open end of the body to allow it to be gripped for removal therefrom.
2. A retractable cigar lighter as set forth in claim 1 wherein the bushing is formed from tubing of substantially constant cross-section.

References Cited

UNITED STATES PATENTS

| | | | |
|---|---|---|---|
| 2,338,565 | 1/1944 | Ashton et al. | 219—267 |
| 2,895,036 | 6/1959 | Ashton et al. | 219—267 |
| 3,040,160 | 6/1962 | Gaudet et al. | 219—267 |

VOLODYMYR Y. MAYEWSKY, Primary Examiner

U.S. Cl. X.R.

219—266, 267